United States Patent [19]

Rummel

[11] 4,311,755
[45] Jan. 19, 1982

[54] NON-STICK COATED STEEL ARTICLE

[75] Inventor: Mitzie K. Rummel, Secane, Pa.

[73] Assignee: E. I. Du Pont de Nemours and Company, Wilmington, Del.

[21] Appl. No.: 220,951

[22] Filed: Dec. 29, 1980

[51] Int. Cl.$^3$ ............................................... B32B 27/00
[52] U.S. Cl. .................................. 428/312.6; 428/331;
428/411; 428/421; 428/422; 428/446; 428/447;
428/448; 428/469; 428/476.3; 428/500;
428/699; 428/701; 428/702
[58] Field of Search ............... 428/331, 308, 411, 421,
428/422, 446, 447, 448, 469, 476.3, 500, 699,
701, 702

[56] References Cited

U.S. PATENT DOCUMENTS

| 3,986,993 | 10/1976 | Vassiliou | 260/23 X |
| 4,110,487 | 8/1978 | Rion | 427/27 |
| 4,204,021 | 5/1980 | Becker | 428/325 |

FOREIGN PATENT DOCUMENTS

| 55-154578 | 12/1980 | Japan . |
| 350130 | 3/1969 | Spain . |
| 1042012 | 9/1961 | United Kingdom . |

Primary Examiner—Marion McCamish
Attorney, Agent, or Firm—Richard H. Burgess

[57] ABSTRACT

A non-stick coated steel article, such as cookware, has a coating of a ceramic frit in two parts, first a non-porous layer, then a porous layer, overlaid with a fluorocarbon primer and, optionally, a fluorocarbon topcoat.

7 Claims, No Drawings

NON-STICK COATED STEEL ARTICLE

BACKGROUND

Steel cookware is difficult to coat with non-stick coatings such as fluorocarbon coatings. Because of the low thermal conductivity and thermal diffusivity compared to aluminum or copper, steel cookware tends to develop portions hotter than other portions. This leads to softening or deterioration of some parts of the coating faster than other parts.

To minimize rusting, and because of the hardness of steel, it is preferable to use a ceramic frit to prepare the substrate for the fluorocarbon coating rather than grit blasting as is often done with aluminum cookware. However, current fluorocarbon primers generally contain polyamide-imide resins which have undesirable reactions with the frit used on steel substrates. Thus, it is necessary to find fluorocarbon primers which will give desirable results on fritted steel substrates.

U.S. Pat. No. 3,986,993—Vassiliou, issued Oct. 19, 1976, describes a fluorocarbon primer composition which contains 1–10% of an alkyl benzene, preferably toluene. Toluene is a solvent which should be avoided when feasible.

Various patents have described frits that can be fired on steel and frits in combination with fluorocarbon coatings. Included are U.S. Pat. No. 3,850,867—Hartmann, issued Nov. 26, 1974 on an aqueous blend of fluorocarbon resins and frits for use on metal such as aluminum.

Japanese patent publication 52/121,685—Matsushita Electric Industries KK, of Oct. 13, 1977 provides a fluorocarbon coating over a fritted metal substrate; as do British Patent 1,239,217—Welsh Tinplate & Metal Stamping Co., Ltd., published July 14, 1971; and British Patent 1,377,955—VEB Jenaer Glaswerk Schott & Gen., published Dec. 18, 1974.

However, none of the known prior art provides a system which is fully satisfactory for non-stick coating on steel.

SUMMARY OF THE INVENTION

The invention provides a coated article comprising a substrate of steel on which is applied a first layer of substantially non-porous ceramic frit, a second layer of porous ceramic frit, a third layer of fluorocarbon primer, and optionally a fourth layer of fluorocarbon topcoat, wherein said primer is derived from a coating composition consisting essentially of:

a. 20–90%, by weight of total solids, a particulate fluorocarbon polymer;

b. 10–80%, by weight of total solids, colloidal silica having a pH of 8.4–9.9 at 25° C., whose particles having a size of 5–100 millimicrons and specific surface area of 125–420 square meters per gram;

c. 1.5–3.5%, by weight of total composition, alcohol containing 4 or more carbon atoms, said alcohol being miscible with water;

d. 1.0–1.5%, by weight of total composition, fatty acid containing 8 or more carbon atoms;

e. 0.3–7%, by weight of total composition, amine having the formula

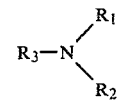

wherein $R_1$ contains 1 to 6 carbon atoms and may contain other functional groups, and $R_2$ and $R_3$ contain one to six carbon atoms or hydrogen;

f. 1–4%, by weight of total solids, of silicone resins, g. 1–4%, by weight of total solids, of a polymeric adjunct;

h. up to 40%, by weight of total solids, of pigment; and i. a liquid carrier.

DETAILED DESCRIPTION

The fluorocarbon primers used in the invention utilize some of the technology of the aforementioned U.S. Pat. No. 3,986,993, incorporated herein by reference, except that the alkyl benzene is advantageously eliminated and much narrower ranges of constituents are found to be needed to obtain satisfactory coating on steel in accordance with this invention.

The steel substrates contemplated for use with the invention are primarily conventional carbon steel, alloy steel and stainless steel materials. Carbon steel was used in the example.

Frits to be used in the invention can be ordinary or proprietary. Preferably the first frit layer is of a composition that can be fired to a rough (unglazed) but substantially non-porous condition at a first temperature, and the second frit layer is of a composition that can be fired at a higher temperature than the first temperature to give an adhered and porous layer. The porosity should be adjusted by firing and formulating so that the fluorocarbon primer layer infiltrates the porosity for bonding but retains a continuous layer or top of the frit. This enhances intercoat adhesion with the fluorocarbon topcoat. Suitable frit compositions include those known in the art, varied to raise or lower the needed firing temperatures by formulating techniques known in the art. For instance, the addition of $Al_2O_3$ will generally raise the firing temperature of a frit.

Frits to be used on cookware do not include toxic materials unsuitable for food contact. Suitable frits are disclosed in U.S. Pat. No. 3,393,086—Keating, issued July 16, 1968; French Pat. 2,282,410—Ferro Corp., issued March 19, 1976 and the aforementioned U.S. Pat. No. 3,890,867 which refers to Bayer frits AL6110 and AL8 Ferro frit CN500. Ferro frit CN700 is particularly desirable.

A frit composition which can be adjusted to raise or lower the firing temperature has the general batch formula:

|  | Parts by Weight |
|---|---|
| Quartz | 18.0 |
| Feldspar | 31.0 |
| Hydrated borax | 37.1 |
| Soda ash | 5.9 |
| Soda niter | 3.8 |
| Fluorspar | 3.0 |
| $Co_3O_4$ | 0.5 |
| NiO | 0.6 |
| $MnO_2$ | 1.1 |
| Total | 101.0 |

The fluorocarbon topcoat can be any of those known in the art to be suitable such as those of Example 4 in U.S. Pat. No. 4,123,401—Berghmans and Vary, issued Oct. 31, 1978. All the above patents are incorporated herein by reference.

EXAMPLE

Since the frit and fluorocarbon topcoats can use conventional technology, the fluorocarbon primer will be exemplified here. The primer was made by blending:

|  | Parts by Weight | |
| --- | --- | --- |
|  | of total composition | of solids |
| Aqueous dispersion PTFE, 60% by weight solids | 46.9 | 63 |
| "Ludox AM" colloidal silica (Du Pont) | 32.4 | 22 |
| TiO$_2$ pigment | 4.6 | 10 |
| Diethylene glycol monobutyl ether | 1.5–3.5 |  |
| Oleic acid | 1.0–1.5 |  |
| Triethanolamine | 0.3–0.7 |  |
| Silicone resin (60% solids in xylene | 1.9 | 3 |
| Acrylic resin (methyl methacrylate/ethyl acrylate methacrylic acid - as in U.S. Pat. No. 3,986,993) | 1.0 | 2 |
| Deionized water | 8.0 |  |
|  | 100 | 100 |

Tests have shown the peel adhesion of the coatings after overnight soaking in detergent solution combined with crack resistance to be best with the quantities of silicone, acrylic and pigment specified for the invention.

I claim:

1. A coated article comprising a substrate of steel on which is applied a first layer of substantially non-porous ceramic frit, a second layer of porous ceramic frit, a third layer of fluorocarbon primer, and optionally a fourth layer of fluorocarbon topcoat, wherein said primer is derived from a coating composition consisting essentially of:
   a. 20–90%, by weight of total solids, a particulate fluorocarbon polymer;
   b. 10–80%, by weight of total solids, colloidal silica having a pH of 8.4–9.9 at 25° C., whose particles having a size of 5–100 millimicrons and specific surface area of 125–420 square meters per gram;
   c. 1.5–3.5%, by weight of total composition, alcohol containing 4 or more carbon atoms, said alcohol being miscible with water;
   d. 1.0–1.5%, by weight of total composition, fatty acid containing 8 or more carbon atoms;
   e. 0.3–0.7%, by weight of total composition, amine having the formula

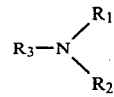

wherein R$_1$ contains 1 to 6 carbon atoms and may contain other functional groups, and R$_2$ and R$_3$ contain one to six carbon atoms or hydrogen;
   f. 1–4%, by weight of total solids, of silicone resins,
   g. 1–4%, by weight of the total solids, of a polymeric adjunct;
   h. up to 40%, by weight of the tortal solids, of pigment; and
   i. a liquid carrier.

2. The article of claim 1 wherein the fluorocarbon polymer of the primer is a fluorocarbon polymer polymerized or copolymerized from monomers selected from monoethylenically unsaturated hydrocarbon monomers and hydrocarbon ether monomers, said monomers being completely substituted with fluorine atoms or a combination of fluorine atoms and chlorine atoms, the polymer having a number average molecular weight of at least 20,000.

3. The article of claim 2 wherein the fluorocarbon polymer is polytetrafluoroethylene.

4. The article of claim 1 wherein the alcohol is diethylene glycol monobutyl ether.

5. The article of claim 1 wherein the fatty acid is oleic acid.

6. The article of claim 1 wherein the amine is triethanolamine.

7. The article of claim 1 wherein the primer is derived from a coating composition consisting essentially of about:
   a. 64%, by weight of total solids, polytetrafluoroethylene;
   b. 22%, by weight of total solids, colloidal silica;
   c. 1.5–3.5%, by weight of the composition, diethylene glycol monobutyl ether;
   d. 1.0–1.5%, by weight of the composition, oleic acid;
   e. 0.3–0.7%, by weight of the composition, triethanolamine;
   f. 3%, by weight of total solids, silicone;
   g. 2%, by weight of total solids acrylic polymer,
   h. 8–12% pigments by weight total solids, and
   i. a liquid carrier.

* * * * *